US006574845B2

(12) United States Patent

Kang

(10) Patent No.: US 6,574,845 B2

(45) Date of Patent: Jun. 10, 2003

(54) PINCERS FOR ASSEMBLING AND DISASSEMBLING THE SPRING OF THE BRAKE SHOES IN A DRUM BRAKE

(76) Inventor: Hsin Fa Kang, P.O. Box 90, Tainan City (TW)

( * ) Notice: Subject to any disclaimer, the term of this patent is extended or adjusted under 35 U.S.C. 154(b) by 0 days.

(21) Appl. No.: 09/965,815

(22) Filed: Oct. 1, 2001

(65) Prior Publication Data

US 2003/0061695 A1 Apr. 3, 2003

(51) Int. Cl.[7] .................................................. B23P 19/04

(52) U.S. Cl. ............................. 29/227; 29/225; 29/268; 29/270; 81/421; 81/424.5

(58) Field of Search .......................... 29/227, 225, 257, 29/286.5, 426.6, 450, 402.08; 269/249, 6; 51/76.1, 486; 254/10.5

(56) References Cited

U.S. PATENT DOCUMENTS 1,007,824 A * 11/1911 Trosper ..................... 81/424.5

1,953,930 A * 4/1934 Dyal .......................... 29/87.1

5,140,734 A * 8/1992 Taggart ....................... 29/227

5,367,755 A * 11/1994 Wood .......................... 29/227

5,865,072 A * 2/1999 Jerdee .......................... 81/9.3

* cited by examiner

*Primary Examiner*—Joseph J. Hail, III
*Assistant Examiner*—Daniel Shanley

(57) ABSTRACT

A pair of pincers for assembling and disassembling the spring of the brake shoes in a drum brake includes a position lever and a hook lever preset in its form, having respective grip at a lower portion and pivotally combined together. The hook lever has a hook formed on a top end and the position lever is fitted with a position member capable to rotate freely therein and the position member has ratchet teeth provided around on an upper end. Thus, the ratchet teeth of the position member are forced to firmly hold the outer wall of the brake shoes, and the hook of the hook lever hooks the spring of the brake shoes and then hold close two grips to disassemble it with quickness.

1 Claim, 3 Drawing Sheets

PINCERS FOR ASSEMBLING AND DISASSEMBLING THE SPRING OF THE BRAKE SHOES IN A DRUM BRAKE

BACKGROUND OF THE INVENTION

This invention relates to a pair of pincers for assembling and disassembling the springs of the brake shoes in a drum brake, particularly to one having the ratchet teeth of a position member on an upper portion of a position lever for firmly holding the outer wall of a brake shoe and the hook of a hook lever hooking the spring of the brake shoe, and then holding close two grips to assemble or disassemble the spring of a brake shoe with easiness and with quickness.

FILED OF THE INVENTION

Generally, a brake drum mechanism of an automobile is fixed on the axle for rotating synchronously and has two brake shoes 5 positioned oppositely inside, as shown in FIG. 1. The brake shoes 5 have hook holes 50 bored on a top surface for strong springs 6 to hook tightly therein and two brake linings 51 coarse but friction-enduring fixedly provided at an outer side. When the brake of an automobile is used, two brake shoes 5 force two brake linings 51 to move outward and press the inner sides of the brake drum and thus produce a great frictional force to control the wheels of an automobile to slow down or stop. But, these brake linings 51 will gradually be worn off after the brake is used for a period, and under this condition, the brake shoes 5 have to be replaced in order to maintain the function of the brake and ensure safety of driving.

DESCRIPTION OF THE INVENTION

For the present, the strong springs of the brake shoes 5 are forcefully disassembled by means of common tools such as a screwdriver, a pair of pincers or the like, thus not only increasing difficulty in disassembling and wasting time but also resulting in damage to the tools or to the components of an automobile.

SUMMARY OF THE INVENTION

The objective of this invention is to offer a pair of pincers for assembling and disassembling the spring of the brake shoes in a drum brake, convenient in using and easy in handling.

The feature of the invention is a hook provided on the top of a hook lever to correspond with the ball joint provided on the top of a position lever.

A position member of the position lever has its sleeve receive the ball joint of the position lever, capable to rotate around but impossible to disengage from the ball joint and further has ratchet teeth formed around on a top end.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
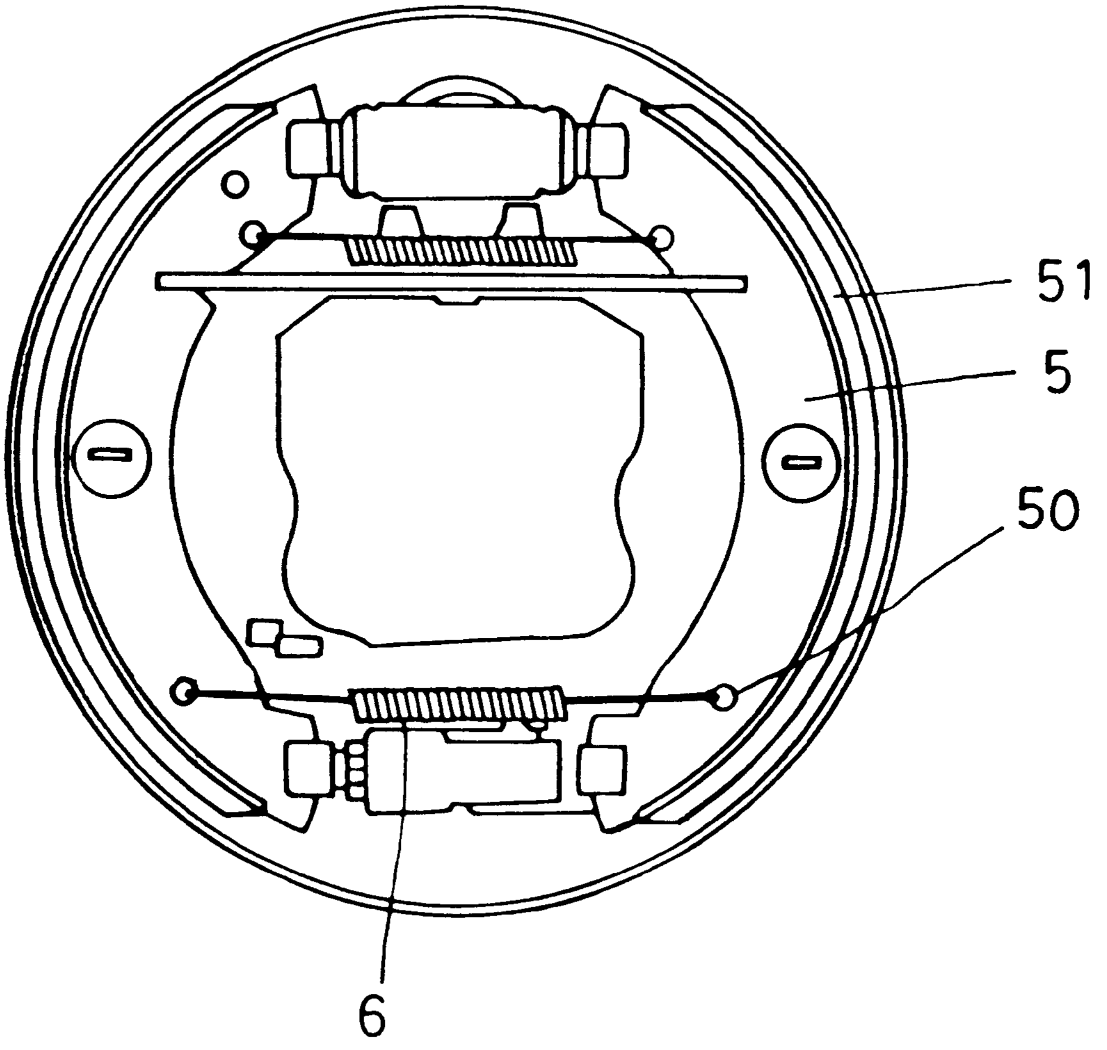
FIG. 1 is a cross-sectional view of a conventional drum brake device.
Figure 2:
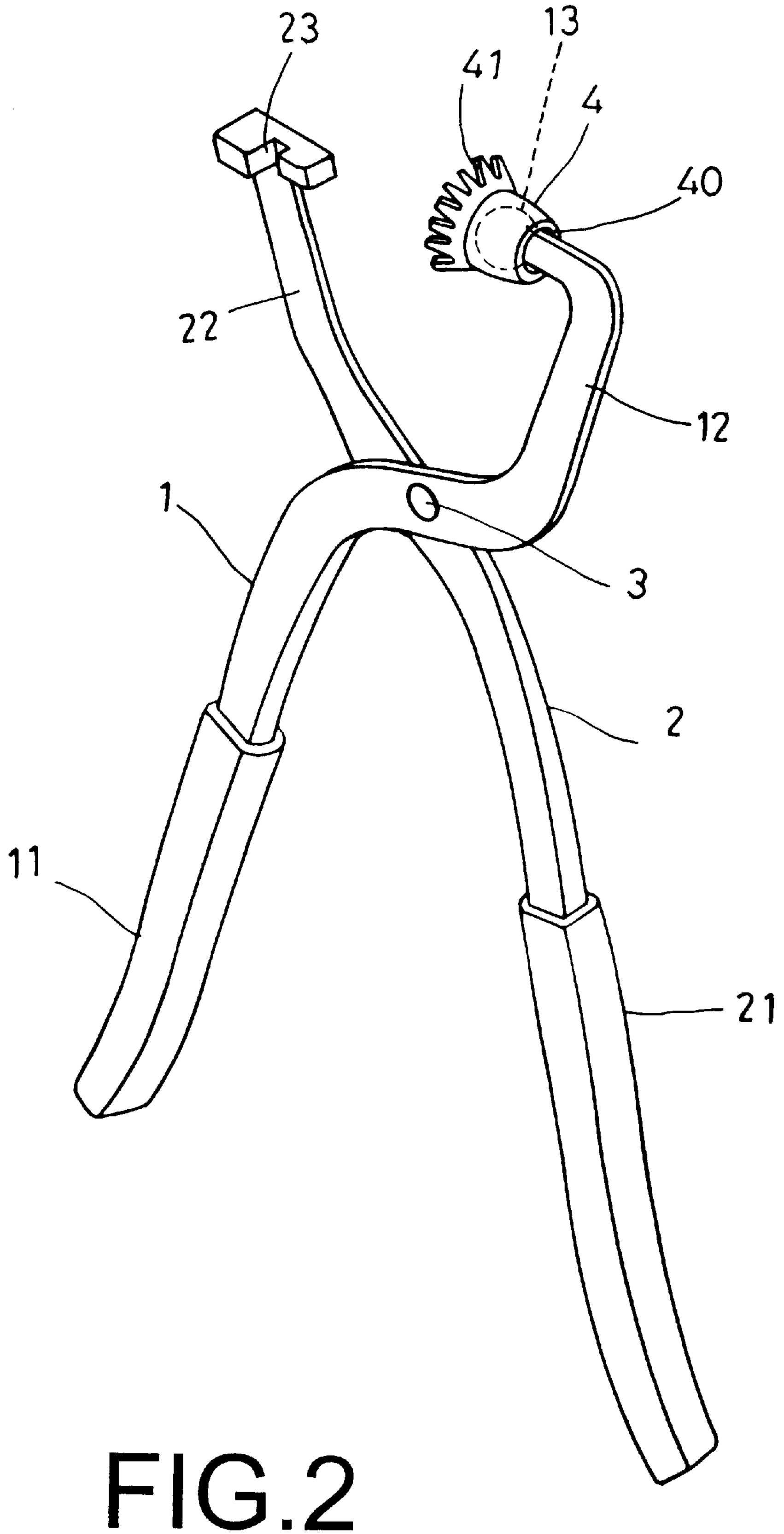
FIG. 2 is a perspective view of a pair of pincers in the present invention; and, FIG. 3 is a perspective view of the pair of pincers in using condition in the present invention.

A preferred embodiment of a pair of pincers for assembling and disassembling the spring of the brake shoes in a drum brake of an automobile in the present invention, as shown in FIG. 2, includes a position lever 1 and a hook lever 2 respectively preset in its form as main components pivotally combined together.

The position lever 1 and the hook lever 2 are pivotally combined together by means of a rivet 3. The position lever 1 and the hook lever 2 respectively have a grip 11 and 21 formed at a lower portion and a clamping portion 12 and 22 formed at an upper portion. The clamping portion 12 of the position lever 1 is curved upward and shaped, having a ball joint 13 formed in an upper end for the position member 4 to engage and rotate freely therein. Besides, the clamping portion 22 of the hook lever 2 is curved and has a hook 23 formed on an upper end. Then, a position member 4 with umbrella-like ratchet teeth 41 on an upper end has a sleeve 40 fitting around the ball joint 13 of the position lever 1, and the circumferential end of the opening of the sleeve 40 is formed shrinking inward a bit in order to prevent the position member 4 disengaging from the ball joint 13 and permit the position member 4 actuated to rotate around by the ball joint 13. Further, the top end of the ratchet teeth 41 of the position member 4 faces the hook 23 on the hook lever 2, thus, finishing assembling a pair of pincers of this invention, as shown in FIG. 2.

Figure 3:
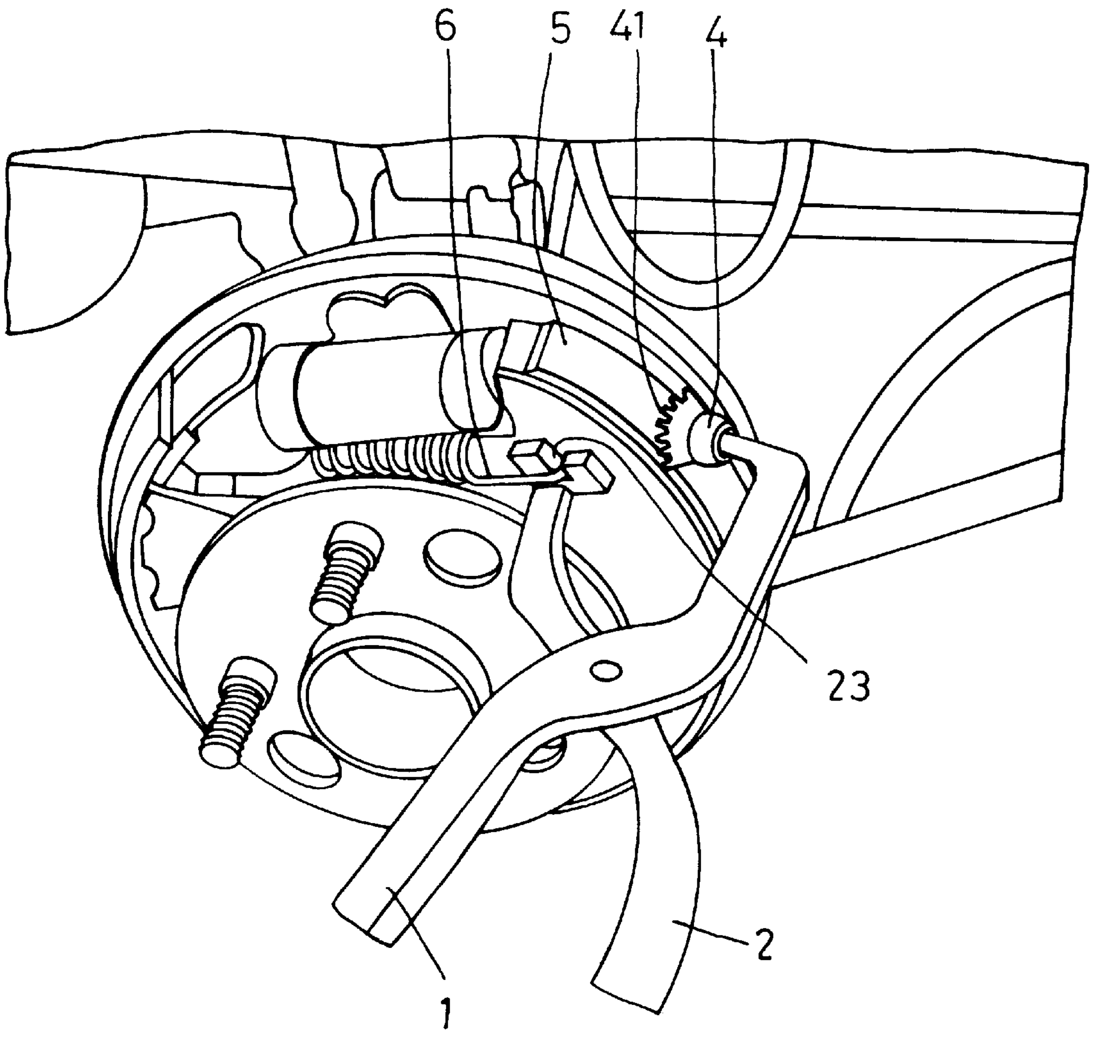

In handling, referring to FIG. 3, firstly hold and push outward two grips 11 and 12 of the position lever 1 and the hook lever 2 to let two clamping portions 12 and 22 separate outward. Next, the ratchet teeth 41 of the position member 4 are forced by the ball joint 13 to firmly grab the outer wall of the brake shoes 5 and the hook 23 of the hook lever 2 hooks one end of the spring 6 on the hook hole 50 of the brake shoes 5. Lastly, hold close two grips 11 and 21 to enable the hook 23 shoes 5. Lastly, hold close two grips 11 and 21 to enable the hook 23 to hook the spring 6 to let it disengage from or engage the hook hole 50 of the brake shoes 5.

This invention has the following advantages as can be noted from the above description.

1. It is convenient in using, easy in handling and capable to enhance working efficiency.

2. It is possible to disassemble the spring of a brake shoes with quickness and with security, without causing any damage possible to the components of an automobile by popular tools.

While the preferred embodiment of the invention has been described above, it will be recognized and understood that various modifications may be made therein and the appended claims are intended to cover all such modifications that may fall within the spirit and scope of the invention.

I claim:

1. A pair of pincers for assembling and disassembling the spring of the brake shoes in a drum brake comprising a position lever and a hook lever respectively preset in its form, said position lever and said hook lever pivotally combined together, with a respective upper portion forming a clamping portion and a lower portion forming a grip; and, characterized by said hook lever having a hook formed on top and said position lever having a ball joint provided on an upper end, said hook and said ball joint facing each other, said ball joint received in a sleeve of a position member, said position member capable to rotate around and impossible to disengage from said ball joint, said position member having ratchet teeth provided around on a top side, thus said ratchet teeth of said position member firmly holding on an outer wall of said brake shoes, said hook of said hook lever hooking the spring on said brake shoes, then said grip held close to let said spring disassembled from or assembled on said brake shoes with quickness.

* * * * *